United States Patent
Branson et al.

(10) Patent No.: US 7,412,709 B2
(45) Date of Patent: Aug. 12, 2008

(54) METHOD AND APPARATUS FOR MANAGING MULTIPLE DATA PROCESSING SYSTEMS USING EXISTING HETEROGENEOUS SYSTEMS MANAGEMENT SOFTWARE

(75) Inventors: Michael John Branson, Rochester, MN (US); Gregory Richard Hintermeister, Rochester, MN (US); James Franklin Macon, Jr., Raleigh, NC (US); Scott Anthony Sylvester, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 10/703,356

(22) Filed: Nov. 7, 2003

(65) Prior Publication Data
US 2005/0102683 A1 May 12, 2005

(51) Int. Cl.
*G06F 9/54* (2006.01)
*G06F 15/16* (2006.01)
(52) U.S. Cl. ..................... 719/328; 709/229
(58) Field of Classification Search .............. 719/328; 709/229
See application file for complete search history.

(56) References Cited

U.S. PATENT DOCUMENTS

| 5,801,689 | A | 9/1998 | Huntsman |
| 5,949,412 | A | 9/1999 | Huntsman |
| 6,138,150 | A | 10/2000 | Nichols et al. |
| 6,219,708 | B1 | 4/2001 | Martenson |
| 6,343,320 | B1 * | 1/2002 | Fairchild et al. ............ 709/224 |
| 6,782,527 | B1 * | 8/2004 | Kouznetsov et al. ........ 717/103 |
| 6,968,553 | B1 * | 11/2005 | Theeten ..................... 719/311 |
| 2004/0153558 | A1 * | 8/2004 | Gunduc et al. .............. 709/229 |

* cited by examiner

*Primary Examiner*—Meng-Ai An
*Assistant Examiner*—Abdou K Seye
(74) *Attorney, Agent, or Firm*—Roy W. Truelson

(57) ABSTRACT

A common consolidation management application provides an interface to the multiple different system management software applications and at least one user input console. An adapter in each of the system management software applications supports communication with the consolidation application. A system administrator issues requests to different system management software applications using a common interface provided by the consolidation application. The consolidation application can be installed over an existing complex of computer systems managed by different management applications, without modifying the managed systems or replacing the management applications.

7 Claims, 8 Drawing Sheets

METHOD AND APPARATUS FOR MANAGING MULTIPLE DATA PROCESSING SYSTEMS USING EXISTING HETEROGENEOUS SYSTEMS MANAGEMENT SOFTWARE

FIELD OF THE INVENTION

The present invention relates to digital data processing, and in particular to the management of digital data processing complexes comprising multiple digital data processing systems.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Early computer systems were very expensive and difficult to use, capable of being programmed and manipulated by only a handful of highly-educated specialists. The cost of operating such computers was correspondingly high, and they were therefore used for only the most essential tasks. The dynamic which has driven the information revolution is the sustained reduction in the cost of computing. Thus, information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The cost of information processing not only includes the cost of computer hardware and software, but perhaps even more significantly, the cost of human resources devoted to operating and maintaining computer systems. Improvements to the usability of computer hardware and software reduce the cost of human resources associated with information processing, either by reducing the amount of time directly devoted to a particular task by a human operator (user), or by reducing the level of training required of a user in order to achieve proficiency in performing the task. Continued progress of the information revolution requires still further improvements to the usability and manageability of computer systems.

Many enterprises operate large networks of computer systems. These networks are often arranged in a hierarchy, in which individual employees, agents, contractors, volunteers or other users perform useful work on terminals or workstations, which are in turn attached to larger computer systems. The larger systems may further be interconnected in hierarchical, web, ring, or other network configurations.

Large computer system networks have assumed an ever larger role in the operations of many enterprises. Transactions with customers or clients are recorded on computers. Internal financial data is stored on computers. Documents are generated, stored and printed on computers. Manufacturing processes are controlled by computers. Products are developed on computers. The list goes on and on. Over time, these large computer system networks become so integrated with the operations of the enterprise that it becomes virtually impossible for the enterprise to function without the computer network.

Unfortunately, these systems do not just take care of themselves, and like any complex piece of machinery, require supervision and maintenance. Because these networks are both very complex and very essential, most such systems have dedicated personnel responsible for their administration and maintenance. These personnel may perform tasks such as changing network configurations, authorizing users to access network resources (or removing authorizations), backing up and restoring data, loading new or upgraded software, analyzing network performance, tuning the network by re-allocating resources, replacing malfunctioning components, and so forth.

In almost any large enterprise, one will find a conglomeration of computer systems which were acquired at different times, for different purposes, from different vendors, using different architectures, and performing different functions. This is understandable, given that enterprises are constantly expanding and changing. Enterprises are often divided into organizational units which perform different functions, and thus have different computing needs. An enterprise may reorganize its operations to make them more productive, or may expand into new lines of operation, or may simply grow in its existing lines of operation. Many of these changes require new computer system capability. It is understandable that persons responsible for obtaining new computer system capability in such circumstances will want computer systems which are most suited to the intended use of the organizational unit involved. Moreover, many enterprises include divisions or other portions which were acquired through purchase, merger or otherwise from other enterprises, and alter acquisition continue to use computer systems which were previously used by the division before its association with the acquiring enterprise.

While the existence of a variety of computer systems in a large enterprise is the result of rational decisions made at the time each of the various systems was acquired, the result of changes over time is often a heterogeneous collection of systems with little in common. Most individual users don't care very much about this complexity, because they become accustomed to using one system, and don't worry about what others are using. However, for people who are charged with supervising and maintaining the enterprise's computer systems, this complexity can be daunting.

Large system complexes are usually managed using system management software. As used herein, system management is the administration and maintenance of one or more computer systems. System management software is software executing on one or more computer systems which is used to administer and maintain the computer system(s) on which it executes, and/or other computer systems which communicate with the system(s) on which the software executes. This software may reside in a dedicated system used only for management of a complex of computer systems, of may reside in a system which concurrently performs other tasks. A system in which system management software for managing other systems resides is referred to herein as a management server, and the systems which it manages are referred to as managed systems. A single management server might manage thousands of managed systems.

For the same reasons that a variety of computer systems exists in many enterprises, a variety of system management software exists. System management software is often acquired for use with a particular subset of the computers within the enterprise, and as the collection of computers changes, the system management software changes accordingly. The variety of different system management software applications means that system administrators and other maintenance personnel must use multiple applications, and often multiple separate computer systems, to manage the computers within an enterprise. This circumstance naturally makes administration more difficult.

The conventional "solution" to this problem has been migration of the computers systems within an enterprise to a common system management framework. I.e., a common system management application or suite of applications, which is intended to manage all the computer systems within the enterprise, is chosen for the use of the administrators based on any desired characteristics. The existing computer systems (i.e., the managed systems) are then migrated to work with the new common system management application (which may be on a new management server). For those systems which do not already support the new common system management application, it is generally necessary to install some additional software.

Unfortunately, this solution is rather expensive, as it can involve modifying the software on a large number of computer systems. For some of the managed systems, particularly older systems, it may be impossible to provide all the functional capabilities desired. Finally, even when migrated, the solution is often only temporary, because mergers, re-organizations, and other changes to the underlying computer systems within an enterprise may re-introduce the problem.

A need exists for improved techniques for managing to complexity of computer systems within an enterprise, particularly techniques which are more easily adapted to rapid changes in the collection of computer systems within an enterprise.

SUMMARY OF THE INVENTION

In an enterprise having or controlling multiple computer systems which are managed by multiple different system management software applications (or suites of applications), a common consolidation application is established as an interface to the multiple different system management software applications (or suites of applications). An adapter is installed in each of the systems having system management software applications, allowing the system management applications to communicate with the common consolidation application. The consolidation application issues requests to the different system management software applications, which in turn perform management functions for their respective managed systems. The management functions performed by each of the different system management applications are not altered, and the existence of the consolidation application is completely transparent to the managed systems. Thus no upgrade or alteration is required of the managed systems themselves.

Thus, in one aspect of the preferred embodiment, an existing computer system complex managed by multiple different system management applications is migrated to a computer system complex having a global management interface without alteration of any of the managed systems, and leaving the functions of the existing system management applications intact.

In the preferred embodiment, the different system management applications communicate with the consolidation application using adapters employing Web Services. Web Services is known communications protocol using an XML-based remote function call capability. The functions supported by an application are defined using Web Services Definition Language (WSDL). Using WSDL, a set of typical management requests is defined for the consolidation application to management server interface. Each request defined in the Web Services interface is mapped in the management server to an existing function performed by the system management application. When the operator using the consolidation application wishes to perform the function, the request is communicated to one or more management servers, mapped to the local function in the respective system management application of each management server, and performed using the various system management applications. The response or responses from the various system management applications are consolidated by the consolidation application for presentation to the operator. Such a function is thus performed in the same manner that it would have been performed had it been invoked initially from one or more management servers, instead of the consolidation application.

Typically, the set of functions which can be invoked from the consolidation application does not include all the functions performed by the management server (although it could), but is a core set of management functions supported by many system management applications. In the preferred embodiment, the existing management servers have all the functions they had originally (before installation of the console interface). An administrator could alternatively invoke any such function directly from the management server, without the use of the consolidation application. The consolidation application is simply an alternative means of invoking the function.

In the preferred embodiment, the consolidation application generates a user interface for a physical system administrator terminal, called a console. This interface is preferably a web browser based interface, in which the consolidation application acts as a web server. The console therefore requires only a conventional browser to access the interface. Multiple consoles, which can be located in diverse locations, can access the same consolidation application.

A common management consolidation application and associated adapters as described herein thus provides the capability to manage a large and diverse network of computer systems from a single physical terminal and single application interface. Moreover, because adapters are only required to be placed in the management servers, and the managed systems themselves are not altered, this is a far less expensive solution that migration of all the managed systems to a common system management platform. Additionally, because each management server preferably preserves all its original functions, it is not necessary to "compromise" on a common system management application which might not perform some function deemed desirable within a subgroup of the enterprise.

The details of the present invention, both as to its structure and operation, can best be understood by reference to the accompanying drawings, in which like reference numerals refer to like parts, and in which:

DETAILED DESCRIPTION OF THE PREFERRED EMBODIMENT

Figure 1:
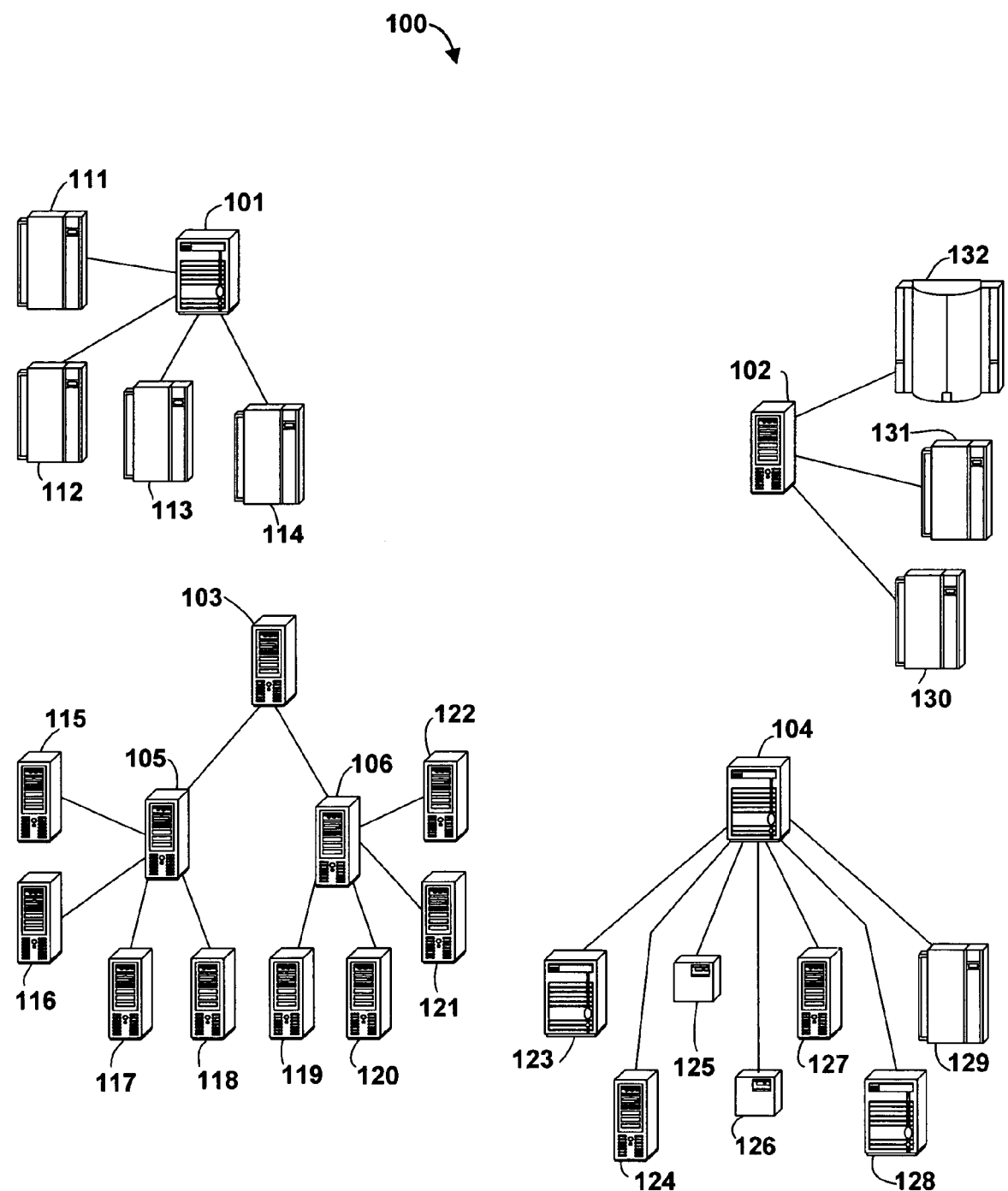
FIG. 1 is a high-level diagram of an exemplary conventional multiple computer system complex managed by multiple systems managements servers.

Referring to the Drawing, wherein like numbers denote like parts throughout the several views, FIG. 1 is a high-level diagram of a conventional multiple computer system complex 100 managed by multiple systems managements servers, as might be typical of computer systems within a large enterprise. Complex 100 contains multiple computer systems functioning as system management servers 101-104, which communicate with multiple additional systems functioning as managed systems 111-132.

Each system management server 101-104 is responsible for managing a respective set of computer systems. The managed set of computer systems associated with each management server is indicated in FIG. 1 by connection links running between the management servers and their respective managed systems. For example, server 101 manages managed systems 111-114, server 102 manages managed systems 130-132, and so on. A management server may communicate directly with the systems in manages, as indicated by direct links, or management functions may be distributed in a hierarchy as shown in the case of systems managed by server 103. In this case, intermediate management servers 105, 106 communicate directly with managed systems 115-122, and ultimately with management server 103, which controls the entire set.

As represented in FIG. 1, management servers 101-104 may be, and usually are, computer systems of different types. Furthermore, managed systems 111-132 may be, and usually are, computer systems of different types. Additionally, within any set of systems managed by a single management server, the managed systems may be computer systems of different types, as shown by systems 130-132, managed by server 102.

System management servers 101-104, as well as intermediate servers 105-106, are typically general purpose computer systems executing system management software. These systems could be dedicated management servers, i.e., computer systems which are used exclusively or nearly exclusively for system management functions, or they could be systems which perform system management tasks in addition to unrelated user applications. Furthermore, it is possible that multiple system management software applications would execute on the same physical computer system, although in the general case, such systems execute on separate computers systems. Where the number of managed systems is very large, it is more likely that the system on which the management server is located will be dedicated to that function.

Each management server 101-104 manages systems within its respective set independently of the other management servers. The management software running on any one management server is not necessary the same as the management software running on any other management server, and in the general case, each management server executes different system management software, although many of the functions performed by different management software running on different management servers may be similar.

The links shown in FIG. 1 between system management servers and managed systems are intended to represent management control paths, rather than actual physical connections. While there could be actual physical connections running as shown, in the general case the system management servers communicate with their corresponding managed systems through one or more networks. Such networks may be arranged in any known configuration or aggregation of configurations, such as webs, rings, star networks, and so forth, which may be coupled together by routers and other links. Furthermore, although links running between different sets of systems (e.g., between management server 101 and its associated managed systems on one hand, and management server 102 and its associated managed systems on the other) are not shown in FIG. 1, in many large enterprises, most or all of the systems are coupled to a common network, and systems within different management sets can communicate with each other over the network. Most large enterprises support some form of internal network for communication among the different systems in the enterprise; however, the network could also be an external network such as the Internet, or could be a combination of internal networks at different locations, with are linked together via an external network such as the Internet.

Although four management servers 101-104, two intermediate servers 105-106, and twenty-two managed systems 111-132 are depicted in FIG. 1, it will be understood that the actual number of such system may vary, and is typically much larger. For example, a single management server in a large hierarchical management configuration might manage four intermediate management servers and 10,000 or so managed systems.

Figure 2:
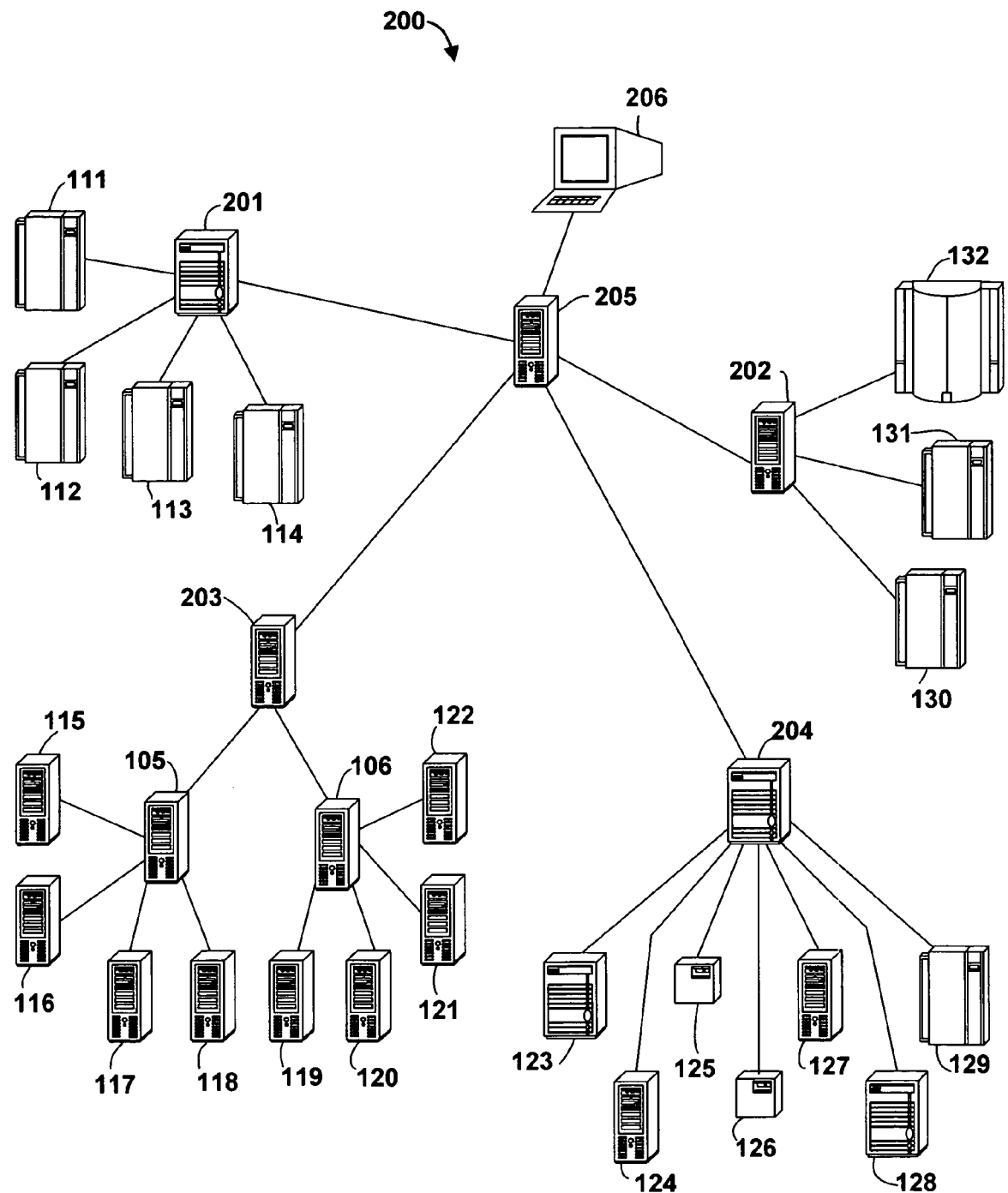
FIG. 2 is a high-level diagram of a multiple computer system complex managed by multiple systems managements servers and a single consolidation management application server, in accordance with the preferred embodiment of the present invention.

FIG. 2 is a high-level diagram of a multiple computer system complex 200 managed by multiple systems managements servers and a single consolidation management application server, in accordance with the preferred embodiment of the present invention. As shown in FIG. 2, complex 200 contains multiple computer systems functioning as system management servers 201-204, which communicate with multiple additional systems functioning as managed systems 111-132. In some cases, intermediate management servers 105, 106, may be interposed between a management server and the managed systems.

In the preferred embodiment, management servers 201-204 differ from conventional management servers 101-104 as explained more fully herein. However, intermediate managements servers 105, 106, and managed systems 111-132 are conventional systems, and would be exactly the same whether managed by conventional management servers 101-104 or management servers 201-204 according to the preferred embodiment of the present invention. One of the advantages of this embodiment is that implementation of a consolidation management application as described herein does not require any alteration to the managed systems, which are generally far greater in number, more diverse in capability, and more geographically dispersed, than the management servers.

A single consolidation management application server 205 communicates with multiple management servers 201-204. Consolidation management application server 205 is a computer system which executes a consolidation application for the various management servers. The consolidation application allows a system administrator or similar user to perform certain system management functions from a single interface, as explained in greater detail herein. The consolidation application is software, which can execute on any suitable configured general purpose computer system. The consolidation application could execute on the same physical computer system as a management server application, or on a distinct physical system which is separate from any of the other management server systems 201-204. E.g., management server 201 and consolidation application server 205 could be physically the same computer system.

Consolidation management application server 205 is linked to one or more consoles 206, of which one is shown in FIG. 2. Console 206 is the physical terminal at which the system administrator interacts with the consolidation application. In the preferred embodiment, consolidation management application server acts as a web server to the console(s), while the console(s) are web clients. I.e., the consolidation application presents its interactive interface as a set of display panels in the form of web pages, which are rendered in a displayable format by a web browser resident in the console. Thus, the console requires no custom software to communicate with the consolidation management application, and the console may use the Internet to connect to consolidation server 205 from almost anywhere. However, the interface between consolidation management application and console need not be a web-based interface, and could alternatively be almost any form of interface. Additionally, console 206 need not be remote from consolidation server 205, and could alternatively be a local workstation or other terminal attached to server 205. Server 205 and console 206 might alternatively be one and the same system, such as a desktop workstation.

Figure 3:
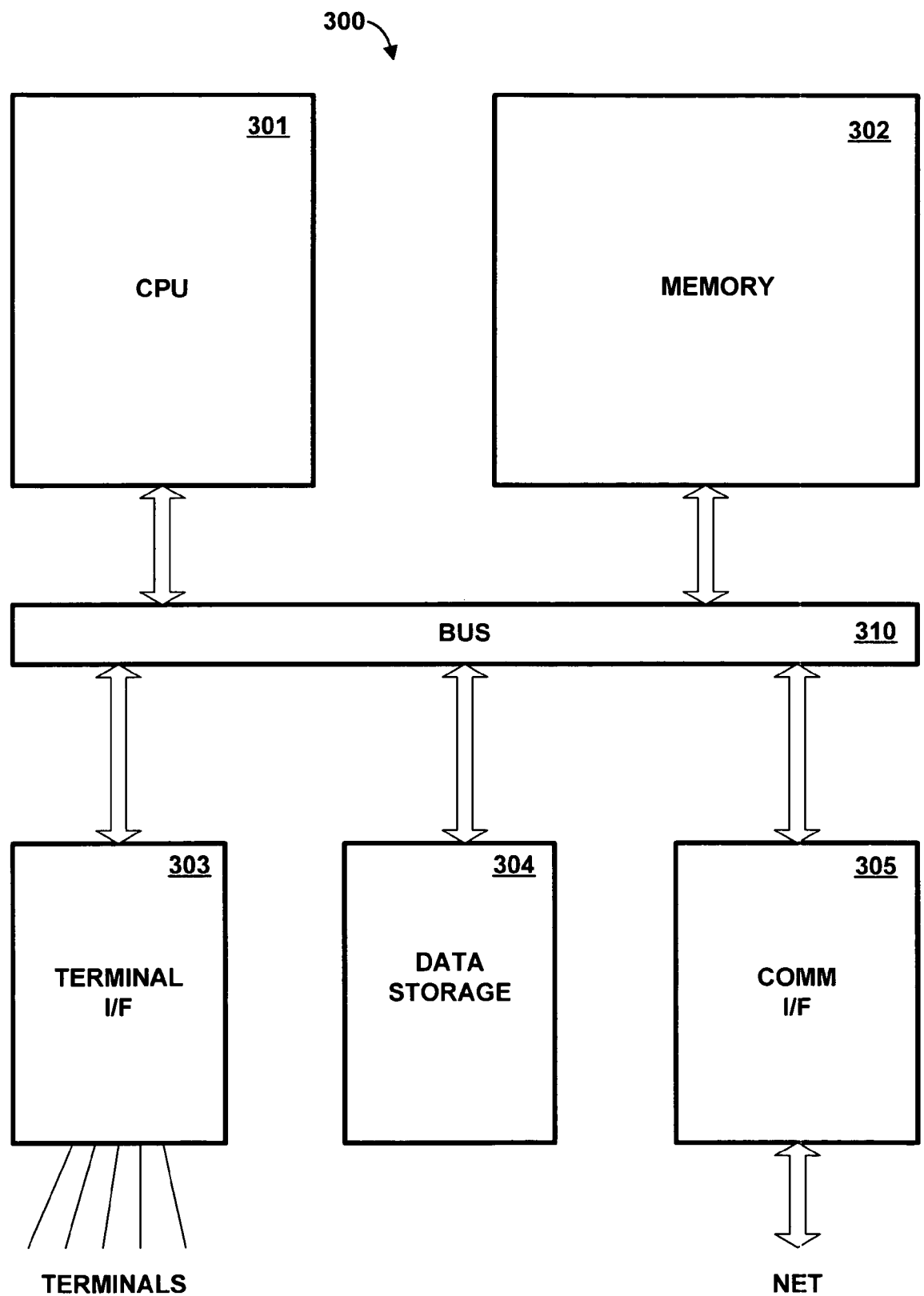
FIG. 3 shows a high-level block diagram showing the major components of a server computer system for managing a computer complex, according to the preferred embodiment.

FIG. 3 shows a high-level block diagram of the major components of a server computer system 300 for performing management related functions in computer complex 200, according to the preferred embodiment. System 300 could represent a system management server 201-204 or a consolidation management application server 205. Server system 300 comprises central processing unit (CPU) 301, main memory 302, terminal interface 303, data storage 304, and communications interface 305. The various devices communicate with each other via internal communications bus 310. CPU 301 is a general-purpose programmable processor, executing instructions stored in memory 302; while a single CPU is shown in FIG. 3, it should be understood that computer systems having multiple CPUs could be used. Memory 302 is a random-access semiconductor memory for storing data and programs; memory is shown conceptually as a single monolithic entity, it being understood that memory is often arranged in a hierarchy of caches and other memory devices. Terminal interface 303 provides a connection for the attachment of a single or multiple terminals, and may be implemented in a variety of ways. Many large server computer systems (mainframes) support the direct attachment of multiple terminals through terminal interface I/O processors, usually on one or more electronic circuit cards. Alternatively, interface 303 may provide a connection to a local area network to which terminals are attached. Various other alternatives are possible. Data storage 304 preferably comprises one or more rotating magnetic hard disk drive units, although other types of data storage could be used. Communications interface 305 provides a physical connection for transmission of data to and from other computer systems via one or more networks. Such networks could include the Internet, any of various local area or wide area networks internal to the enterprise which owns or controls computer complex 200, or any other network, now known or hereafter developed. Communications bus 310 supports transfer of data, commands and other information between different devices; while shown in simplified form as a single bus, it is typically structured as multiple buses, and may be arranged in a hierarchical form.

Server system 300 shown in FIG. 3 is intended to be a simplified representation for illustrative purposes, it being understood that many variations in system configuration are possible in addition to those specifically mentioned here, and that the complexity of a typical system and number of attached devices is typically greater. While system 300 is shown with a terminal interface 303 depicting multiple attached terminals, as in the case of a typical large multi-user system, a server system could alternatively be a single-user system such as a workstation or desktop "personal computer". Server system 300 might also be a system having no attached terminals, in which all interaction with the system is through client/server connections.

Figure 4:
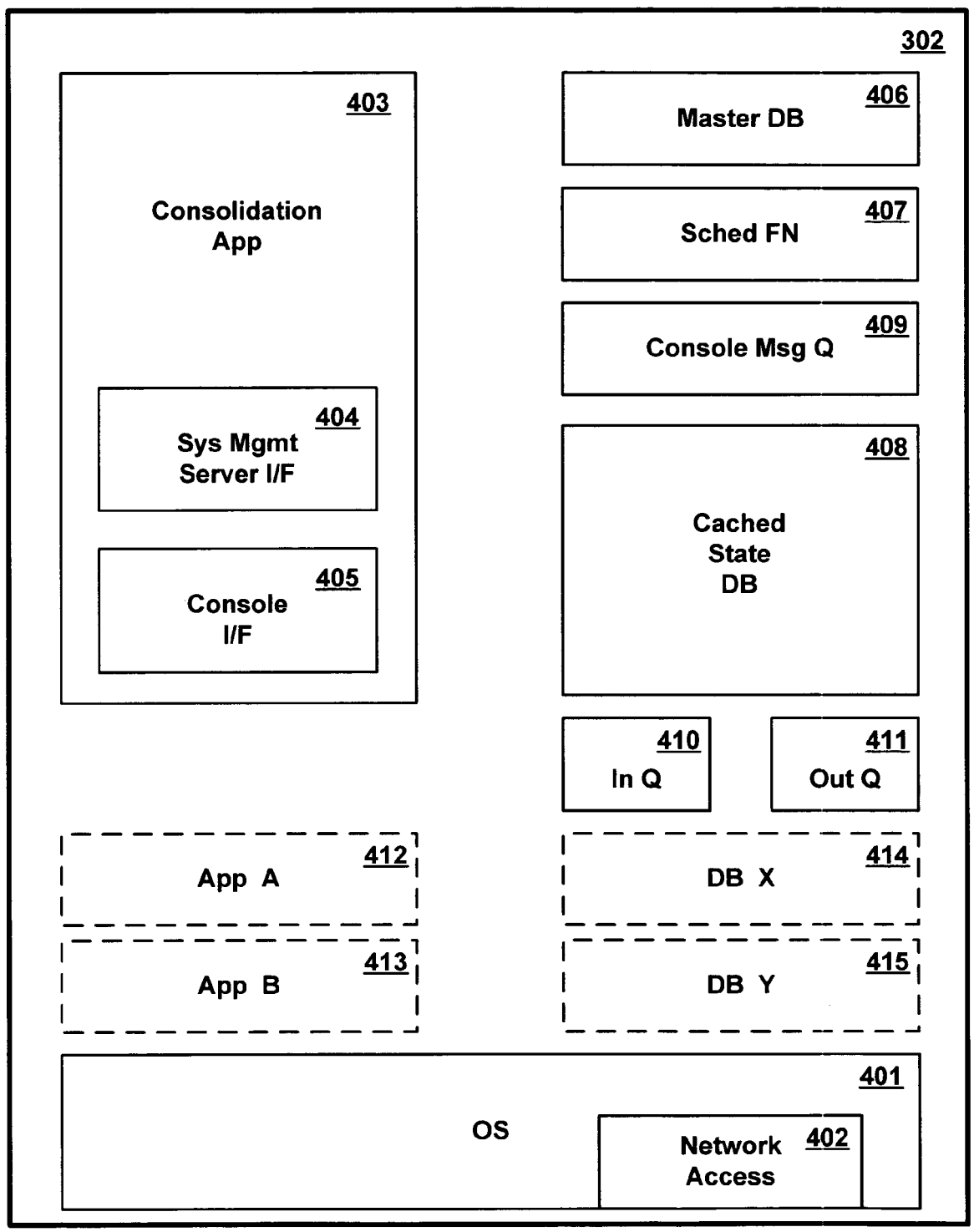
FIG. 4 is a conceptual illustration of the major software components of a consolidation server system, according to the preferred embodiment.

FIG. 4 is a conceptual illustration of the major software components of consolidation server system 205, represented as components of memory 302, according to the preferred embodiment. Operating system 401 is executable code and state data providing various low-level software functions, such as device interfaces, management of memory pages, management of multiple tasks, etc. as is well-known in the art. In particular, operating system 401 includes at least one network access function 402, which in the preferred embodiment includes an Internet access function. Network access function 402 is software which communicates through network interface 314 to the one or more external networks. Network access function 402 generally handles network communications on behalf of applications executing in consolidation server system 205. Specifically, consolidation application 403 invokes network access function 402 to handle communication of data over one or more networks. Although network access function 402 is shown as part of operating system 401, it could alternatively be a separate software module.

Consolidation application 403 is an executable program which acts as both a client and a server to provide an interactive user interface to one or more system administrators or similar users at respective consoles 206, and to invoke functions within and receive responses from multiple system management servers 201-204, as described in greater detail herein. Consolidation application 403 includes a system management server interface 404 for generating data transmissions to and decoding transmissions from system management servers 201-204. In the preferred embodiment, communications between consolidation application 403 and the system management servers use the Open Grid Services Architecture, which is an extension of Web Services architecture. However, other protocols could alternatively be used. Consolidation application 403 further includes a console interface 405 for generating console communications. In the preferred embodiment, console interface 405 is a conventional web server interface which builds interactive display panels in HTML for display on a web browser within the console.

Consolidation master database 406 is a database local to consolidation server 205 containing configuration and other information necessary for communicating with the various system managements servers 201-204, and with console 206. Specifically, master database 406 contains data identifying each system management server 201-204 in computer complex 200. Identifying information includes a network address or similar identifier enabling communications to be directed to the desired management server system. It further includes information identifying management functions supported by the management server system in the set of management functions which can be requested by consolidation application 403. This information could be in the form of a flag bit for each respective management function, or could be an identifier of the management program and version number executing on the management server system. Master database 406 optionally includes substantial additional information which, while not strictly necessary for performing minimal functions described herein, might be useful to provide to personnel using the consolidation application (i.e., to display at a console, or for other purposes). For example, master database 406 optionally includes descriptive information concerning the management server system, such as: type of processor(s), operating system, storage capacity, and so forth; physical location of the system; name(s) and telephone numbers of key contacts (such as security, repair, and other administrative personnel). Master database 406 may further contain profile information regarding system administrators authorized to use consolidation application 403.

Scheduled function database 407 contains information regarding functions which are to be sent to one or more management servers at a scheduled time. Scheduled functions database allows an administrator to schedule a management function in the future, either to be performed at a specific time or times, or on a periodic basic. When data in scheduled functions database indicates it is time to dispatch a function request to a management server, consolidation application dispatches the function request automatically, without the need for the system administrator to be logged on at the console.

Cached state database 408 contains state information with respect to complex 200 which has been returned to consolidation application 403 in response to function requests. State information may include configuration information, status information, historical usage data, error logs, or any other information which may be returned by the system management servers. It should be noted that information in cached state database 408 is inherently second-hand, and that the system management servers are the authoritative repository of such information. For example, cached state database may include a list of all managed systems of a particular management server, but the list will only be current as of the last time such data was requested from the management server. Due to frequent configuration and other changes, new data should be requested whenever it is necessary to have precise information. On the other hand, caching such data may still be useful to administrators, in order to reduce the volume of requests for new data. Data may also be cached in database 408 because the administrator who requested it is logged off by the time the data is received in consolidation server 205. Preferably, all cached data has a timestamp or other indicator of its age, so that the user may judge whether it is too stale to be relied upon.

Console message queues 409 contain messages for the console(s). In general, these messages are generated in response to responsive data received from the system management servers. For example, if a request is issued to a system management server to gather certain performance data, a message may be placed in the console's message queue when a response is received from the system management server, indicating that the data is ready. Typically, console messages are immediately displayed interactively as part of the web user interface. However, they could also saved until retrieved by the operator, particularly where the operator is not logged on when the message is received. Preferably, messages remain in the message queue 409 until deleted by the console operator.

Input queue 410 temporarily stores communications received over the network or networks from console 206 or management servers 201-204. In the case of console communications, these are generally server requests (the console being the client), either to perform some management function or provide information to the console. In the case of management server communications, incoming communications are typically responses to previous requests from the consolidation application (the consolidation application being the client). Incoming communications from input queue 410 are handled generally by consolidation application 403. Consolidation application 403 may respond to incoming console requests by transmitting locally available information to the console, by transmitting one or more management function requests to one or more management servers, or otherwise. Consolidation application 403 may respond to incoming responses from a management server by adding data to cached state database and/or transmitting data to a requesting console, or in some other appropriate manner. Although a single queue is shown, there could be multiple queues.

Output queue 411 temporarily stores outgoing communications for transmission over one or more networks. I.e., outgoing management function requests destined for a system management server 201-204 are formatted according to a predetermined protocol by system management server interface 404 and enqueued in output queue 411 for transmission. Outgoing server responses to console requests are formatted by console interface 405 and enqueued in queue 411. Although a single queue is shown, there could be multiple queues.

Consolidation system 205 may optionally contain additional applications 412, 413 and databases 414, 415. These optional additional applications may be related to system administration, or might be unrelated applications.

Figure 5:
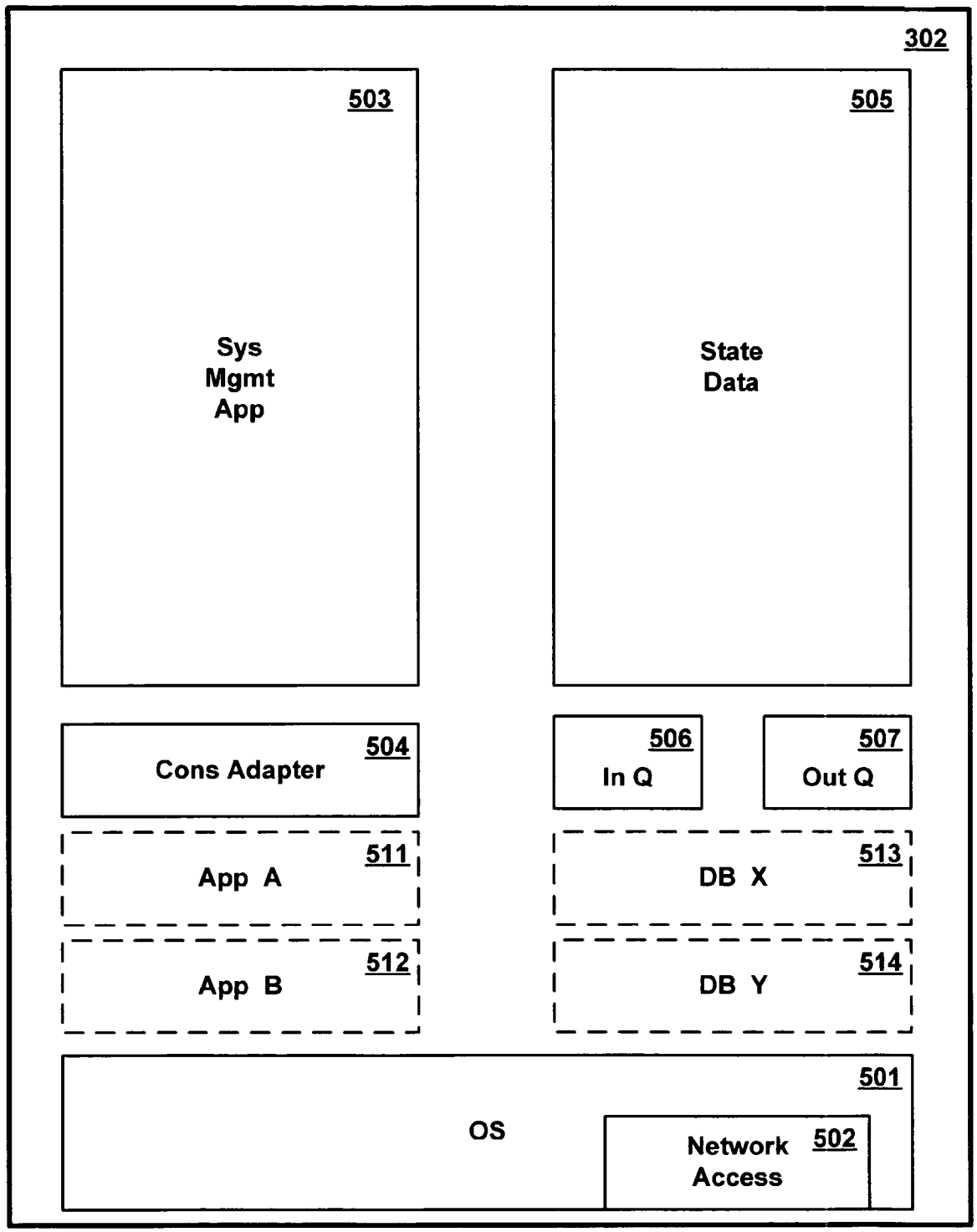
FIG. 5 is a conceptual illustration of the major software components of a system management server, according to the preferred embodiment.

FIG. 5 is a conceptual illustration of the major software components of a system management server 201-204, represented as components of memory 302, according to the preferred embodiment. Operating system 501 and network access function 502 provide function analogous to those of operating system 401 and network access function 402, respectively, of consolidation server system 205. While the functions provided are analogous, these are not necessarily the same operating system or network access function (although they could be).

System management application 503 is an executable program which performs system management on a subset of systems in computer complex 200. The functions performed by system management application could be any of a variety of functions normally performed by system management software. In particular, it is preferred that system management application 503 perform all of the core management functions described herein, in order to support the full range of functions supported in consolidation application 403. However, support for all of the listed functions is not a requirement, and a system management application could alternatively support only some of the core functions. Generally, system management function 503 will perform various management functions in addition to the core management functions described herein.

System management application 503 accesses a database of state data 505 to perform management functions. State data 505 may include configuration data for the systems managed by system management application 503, status information for the systems, usage and accounting data, error logs, and so forth. Some of the data in state data 505 may be used to provide responses to a request from the consolidation application.

Consolidation adapter 504 works with system management application to invoke core management functions from the consolidation application. Specifically, consolidation adapter receives requests from the consolidation application to invoke core management functions, and responsive to these requests, invokes corresponding management function within system management application 503. Such a function may be invoked using any of various conventional methods. For example, system management application 503 may have defined application programming interfaces (APIs) for invoking its functions. Alternatively, adapter 504 may generate input simulating an interactive user. The method chosen will depend on the specifics of the system management application. I.e., a consolidation adapter is specific to the system management application with which it interacts. Where multiple different system management applications exist in the same computer complex, each such application will have a different consolidation adapter. However, all consolidation adapters maintain a common interface with the consolidation application 403. As explained previously, communications with the consolidation application preferably use the Open Grid Services Architecture.

System management application 503 is preferably a stand-alone conventional application, which does not require consolidation adapter 504. I.e., system management application 503 preferably supports its own user interface for receiving commands from a user and presenting responses to the user, and maintains all data necessary for invoking the supported functions. It is envisioned that the system management application is generally a pre-existing application which performs management functions on the set of managed systems. In accordance with the present invention, it is not necessary to make any alterations to the existing system management applications within a computer complex. Consolidation adapter 504 is typically added to a system management server which has been running a system management application for some time, in order to support invoking the core set of functions at the consolidation application. However, this temporal relationship is not strictly necessary, and it would be possible to load both applications at about the same time. System management application 503 is shown in FIG. 5 and referred to herein as a single application for clarity of illustration and explanation, although it is often a suite of applications. As used herein, "system management application" should be understood to include a suite of applications.

Input queue 506 temporarily stores communications received over the network or networks from consolidation application 403 or one of managed systems 111-132 (or an intermediate management server 105-106. Requests from consolidation application 403 are handled by consolidation adapter 504, which invokes a corresponding function in system management application 503. Communications from managed systems or intermediate management servers are handled directly by the system management application 503. Although a single queue is shown, there could be multiple queues.

Output queue 507 temporarily stores outgoing communications for transmission over one or more networks. I.e., outgoing responses to consolidation application 403 are formatted according to a predetermined protocol by consolidation adapter 504 and enqueued in output queue 507 for transmission. Outgoing communications to the managed systems, such as management function commands, are placed on the output queue directly by system management application 503. Although a single queue is shown, there could be multiple queues.

A system management server 201-204 may optionally contain additional applications 511, 512 and databases 513, 514. These optional additional applications may be related to system administration, or might be unrelated applications.

It will be understood that FIGS. 4 and 5 are conceptual views for purposes illustrating the present invention, and that the actual number of software components in a typical system is much larger. Furthermore, although certain components are shown as combined or separate entities, combined components may actually be separate components, and vice-versa. While the software components are shown conceptually as residing in memory, it will be understood that in general the memory of a computer system will be too small to hold all programs and data simultaneously, and that information is typically stored in data storage 304, comprising one or more mass storage devices such as rotating magnetic disk drives, and that the information is paged into memory by operating system 401 or 501 as required.

In the preferred embodiment, a core set of system management functions is supported through the consolidation application. The user selects a request at the console (acting as a web client) to the consolidation application (acting as a web server), the consolidation application issues the request to a management server to perform the function, and the management server responds. The response may include providing information residing in the management server, obtaining information from managed systems of the management server, or executing programs in either the management server or its managed systems. A representative cores set of functions is described below. In this representative set, the functions are grouped into five WSDL port types, named the ConsolidatedSystemsManagementPort, MonitorPort, SystemPort, MessagePort and ProcessPort.

The ConsolidatedSystemsManagementPort contains the following functions:

getSystemNames: This request returns a list of the names of all systems defined in the management server. Because the managed systems are constantly changing, the consolidation application should request a list whenever it needs current information.

getSystemGroupNames: Systems administrators can define arbitrary groups of systems, for any of various purposes. For example, systems may be grouped according to organizational entity, physical location, type of system, type of work performed on the system, or according to some other factors, alone or in combination. This request returns the names of all groups defined in the management server.

getDefinedTasks: A system administrator may define tasks to be executed by a system management application. The system management application maintains a list of such pre-defined tasks locally. Tasks are a form of macro, in which one or more management functions performed by the system management application, along with function parameters, are grouped to form a pre-defined task. The getDefinedTask request returns a list of all pre-defined task in the management server, which the requester has authority to invoke. In the preferred embodiment, the core set of management functions does not include the capability to define tasks, since that capability is often very specific to the system management application. A task must be defined by directly accessing the system management application. However, once defined, it is possible to run the task from the consolidation application.

getDefinedMonitors: This request returns a list of all defined monitors managed by the system management application. A monitor continually or periodically gathers information about some particular resource (e.g, storage utilization) of one or more systems. Certain pre-defined events may cause a monitor to halt execution and save status. Like tasks, any monitors must be defined directly by the system management application.

getMessageCategories: Each system management application may have its own defined message categories, which might be fixed or programmable. This request returns the message categories defined in a system management application.

runTask: runs a task defined in a request string input by the requester.

runDefinedTask: runs a previously defined task which is identified by name (see getDefinedTasks above).

startTaskBasedOn: This request is re-runs a task which was previously executed; the previous task is an input parameter passed by the requestor.

startMonitor: This request starts a monitor identified in the request.

restartMonitor: This request restarts a monitor which has halted, e.g., due to a trigger condition. The trigger condition is cleared and the monitor started again.

getSystemStatuses: This request requests the current status of one or more enumerated systems. The management server responds with status. The status reported is a simple indicator of whether the system is currently operating. I.e., at this level, operating parameters such as CPU usage, number of logged on users, etc. is not reported.

getGroupStatuses: This request returns the current status of each group defined in the management server. The status reported is a simple indicator of whether the group is currently operating, meaning that the systems within the group are operating. Where some systems in the group are not operating and other are, the status may include a gray indicator showing what proportion of systems are operating.

getTaskStatuses: Returns the current status of any tasks that requestor had started on the system management application.

getMonitorStatuses: Returns the current status of one or more monitors to which the requestor has access; the monitors are identified in the request.

GetMessages: Returns a list of all messages in a particular category. The message category is a required input parameter.

The MonitorPort contains the following functions:

getMonitoredValues: returns the monitored values produced by a monitor identified in the request. For example, if the monitor is a storage monitor, monitored values might include total storage utilization, frequency of storage accesses, average latency of access, and so forth.

getValueDetails: This request returns more detailed monitored values than returned in the getMonitoredValues request.

The SystemPort contains the following functions:

getSystemAttr: returns various semi-permanent properties of a system identified in the request.

GetSystemProcesses: returns a list of all processes currently executing on a system identified in the request.

The MessagePort contains the following functions:

getMessageDetail: returns the specific contents of a message identified in the request.

deleteMessage: deletes a message from the message queue.

The ProcessPort contains the following functions:

getProcessAttributes: returns the underlying attributes or properties of a process identified in the request, such as the type of process, process priority, authority, and so forth.

suspendprocess: temporarily halts execution of a process while preserving process state.

resume process: resumes execution of a previously halted process.

endProcess: forces a process to terminate.

It will be understood that the set of core functions described above is simply one example of a representative set, and that other or additional functions (e.g., monitor creation, installation of software fixes, etc.) could be included.

In accordance with the preferred embodiment of the present invention, configuration application functions as the intermediary between the various system management applications and the console, to provide a single unified interface at the console. The console is preferably entirely conventional. I.e., the console executes an interactive web browser session, from which the user can input data, e.g., using HTML forms or any other input mechanism supported by a web server, and can receive output from the consolidation application, acting as a web server, in the form of HTML web pages. The system management applications themselves are largely untouched, but a respective adapter for translating WSDL communications and invoking functions from the consolidation application is placed in each system management server. The operation of the consolidation application is described below and illustrated in FIG. 6.

Figure 6A:
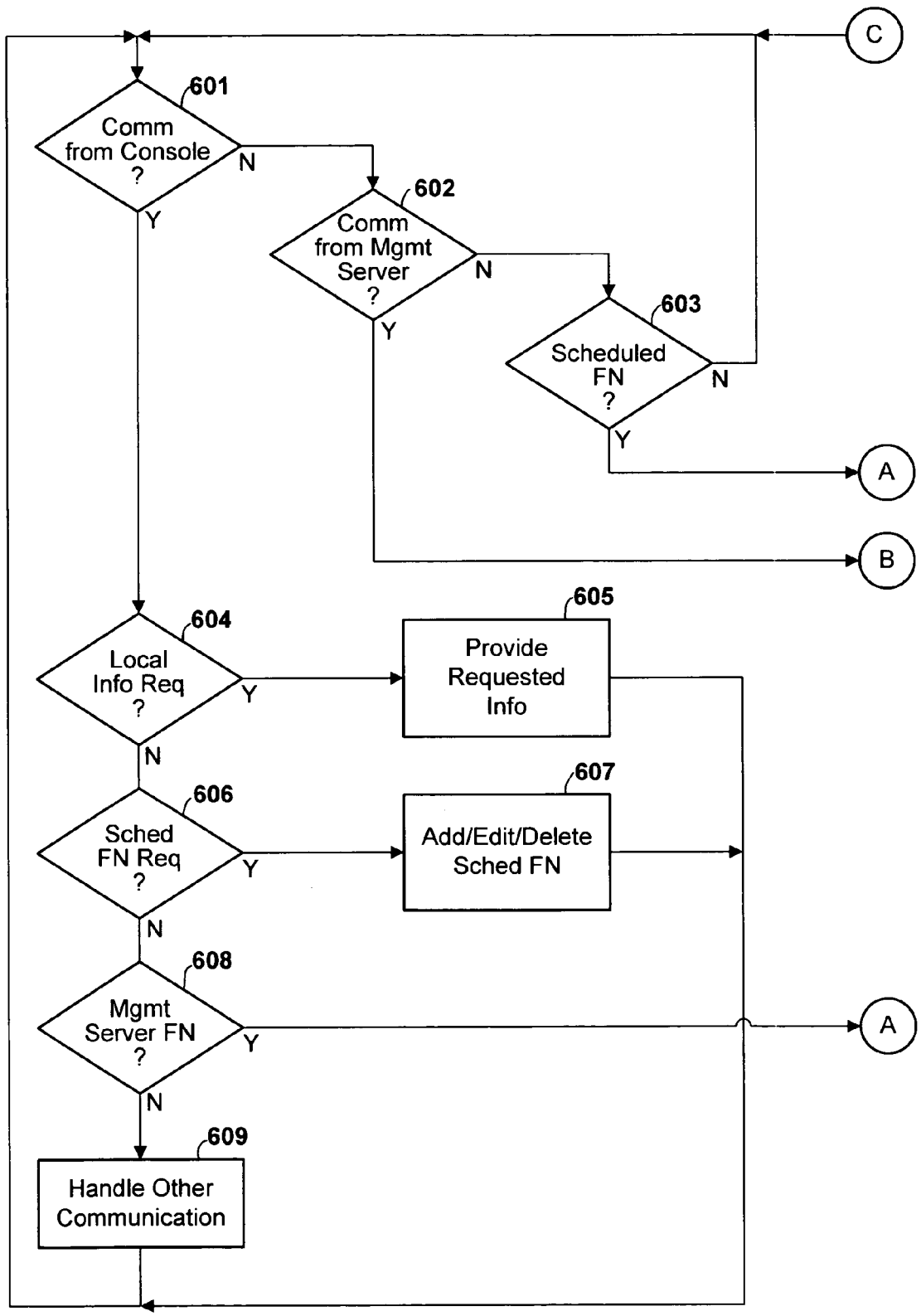
FIGS. 6A and 6B (herein collectively referred to as FIG. 6) are a high-level flow diagram of the operation of a consolidation application for consolidating multiple system management applications, according to the preferred embodiment.
Figure 6B:
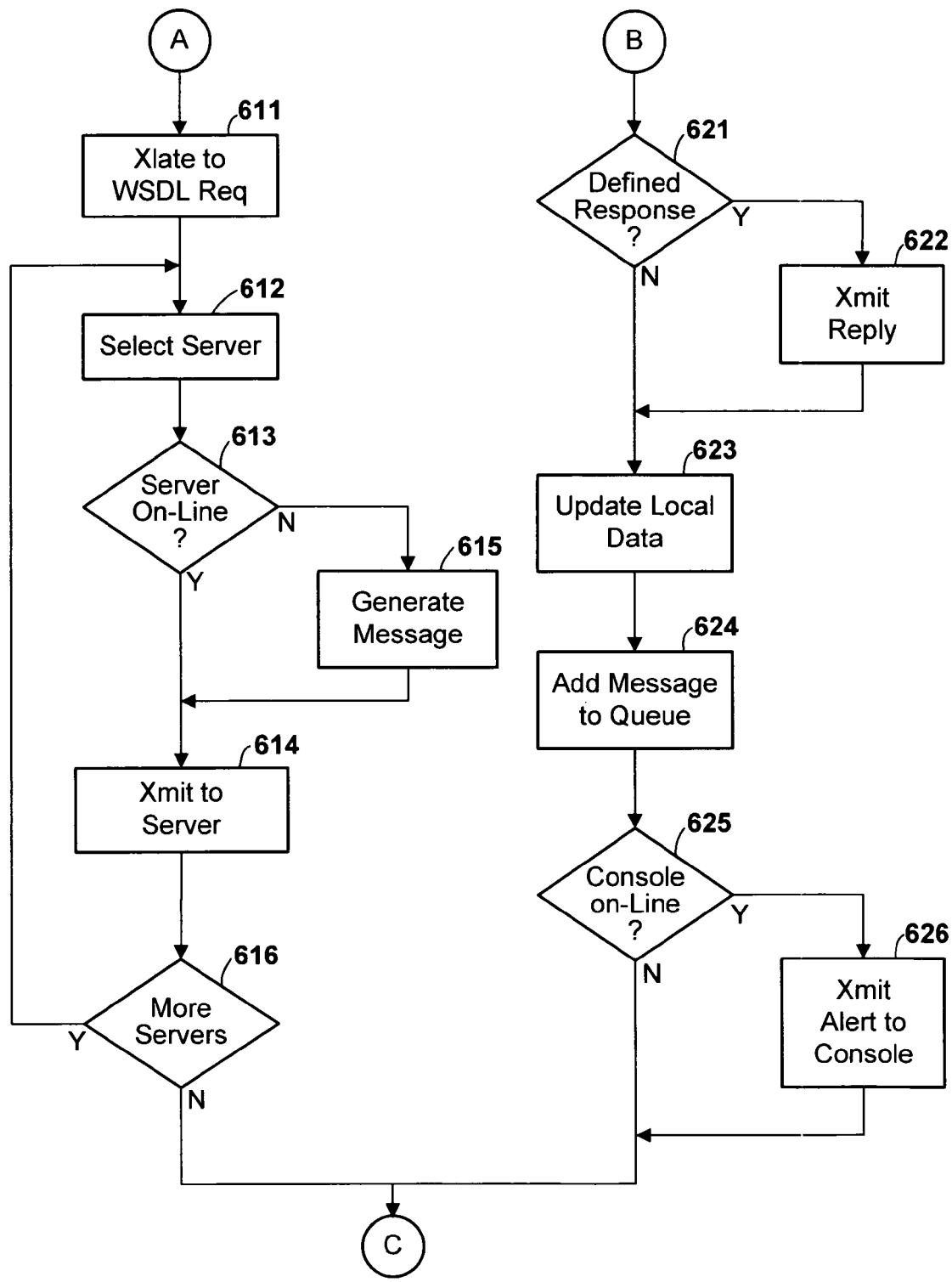

FIG. 6 is a high-level flow diagram of the operation of the consolidation application, according to the preferred embodiment. Referring to FIG. 6, consolidation application generally responds to communications received over the network(s), and may initiate action based on internally scheduled functions. If there is no communication or action pending, consolidation application waits in the loop created by blocks 601-603.

If a communication is received from a console, the "Y" branch is taken from block 601. Such a communication might be of several different types. The communication may request locally available information, i.e., information which is immediately available in consolidation server 205, without need to obtain it from other systems (the "Y" branch from block 604). The request for locally available information could be a request for messages from a console message queue 409, a request for data previously returned by one or more system management applications and stored in cached state database 408, or some other locally available information. If the communication is a request for locally available information, the information is obtained from local sources, formatted in an appropriate HTML form by console interface 405, and transmitted to the requesting console client (block 605).

The console communication may involve the scheduling of functions (the "Y" branch from block 606). In this case, consolidation application presents one or more interactive function scheduling screens, from which the requesting user may add, edit or delete one or more scheduled functions (block 607). Scheduled functions thus entered by the user are stored in scheduled functions database 407.

The communication from the console may alternatively be a request for service from one or more system management applications (the "Y" branch from block 608), such as a request for information available to such applications, a request that a task or monitor be started, and so forth. In this case, the consolidation application translates the data received from the console to a client request into one or more WSDL requests in the global WSDL format to one or more management servers (block 611). The consolidation application selects a management server from among the one or more servers specified by the console user (block 612). If the management server is on-line (the "Y" branch for block 613), the request is transmitted (block 614); otherwise an appropriate status message is generated to inform the console user that the server was unavailable (block 615). If there are more servers specified in the console request, the "Y" branch is taken from block 616 to select another server at block 612. When all specified servers (there might be only one) have been processed, the "N" branch is taken from block 616, to return to block 601. Thus, a single console request may cause multiple WSDL requests to multiple management servers. Responses from all of these management servers may need to be consolidated by the consolidation application for display on the console.

If the communication from the console was some other form of communications (i.e., neither a request for locally available information, not a schedule function action, nor a request for service from a system management application), the consolidation application handles the communication as appropriate (block 609). For example, the communication might involve logging in or out, authenticating a user ID and password, or any number of miscellaneous administrative tasks.

Returning to the idle loop at blocks 601-603, if a communication is received from a system management server (the "Y" branch from block 602), the consolidation application determines whether a pre-defined response exists (block 621). In some cases, the console user may specify in advance an action to be taken upon the occurrence of some event in the management console. For example, the user may specify that a monitor should be restarted automatically in the event that the monitor is halted as a result of a trigger condition. If a pre-defined response exists (the "Y" branch from block 621), the pre-defined reply is transmitted to the management server (block 622). The consolidation application then updates the local cached state database 408 as necessary with any new information received in the communication from the server (block 623). It will be appreciated that many communications do not contain any such data. The consolidation application then adds a message to console message queue 624, to indicate receipt of the communication from the server. While such a message is not strictly necessary in all cases, in general the console will be apprised of communications from a system management server. If the console is currently on-line (the "Y" branch from block 625), the consolidation application will transmit an alert to the console, which immediately appears on the console screen (block 626). The alert informs the console operator that a communication has been received from a management server, any may identify the type of communication at a high level of generality. If the operator wishes further details, he must request the message from message queue 409 or view data from local cached database 408. The consolidation application, having finished servicing the server communication, returns to the idle loop at blocks 601-603.

If a timer has timed-out, indicating it is time to initiate a previously scheduled function recorded in scheduled functions database 407, the "Y" branch is taken from block 603. In this case, the function is retrieved from database 407, and the consolidation application performs steps 611-616 with respect to the scheduled function, in much the same manner as it would for an on-line console request.

It is envisioned that a consolidated system management apparatus as described herein will be retrofitted on an existing computer complex having multiple different system management applications located on different servers. One of the advantages of the present invention, according to the preferred embodiment thereof, is that it is possible to provide a unified system management interface to operators without replacing the existing system management applications or modifying any of the managed systems. The process of installing a consolidated management apparatus in an existing complex is illustrated in FIG. 7.

Figure 7:
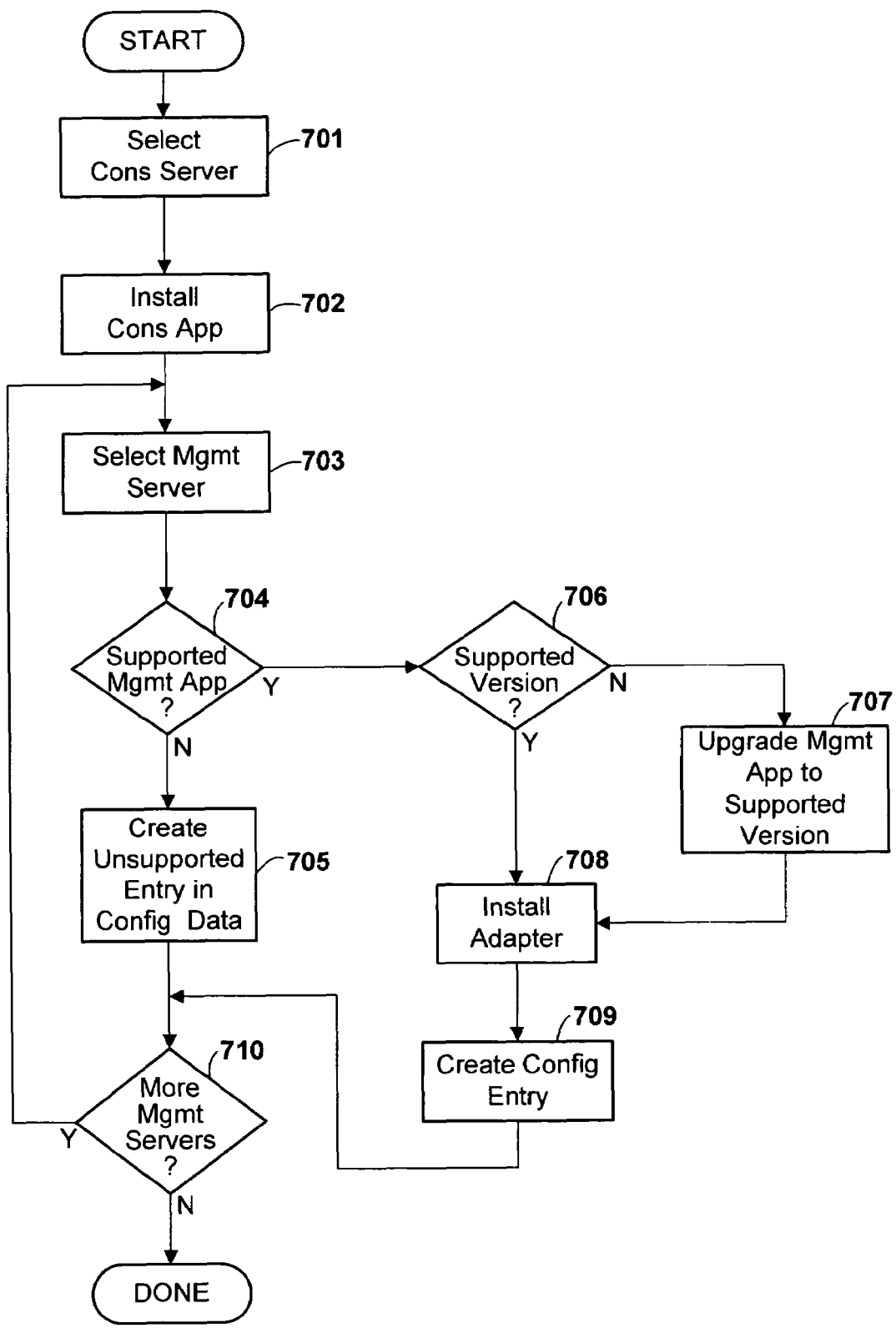
FIG. 7 is a high-level flow diagram showing the process of installing a consolidated system management apparatus in an existing computer complex having multiple system management servers, according to the preferred embodiment.

Referring to FIG. 7, a physical system is chosen as the consolidation server 205 (block 701). This could be an existing system, or a newly installed system. If it is an existing system, it could be one of the system on which an existing system management application resides, or a different system. The consolidation application is installed in the chosen consolidation server system (block 702).

A system management server is selected (block 703) and a determination is made whether the system management application residing in the chosen system manager is a supported application (block 704). A supported application is one for which a suitable consolidation adapter exists. In accordance with the preferred embodiment, a separate consolidation adapter must be provided for each different system management application. This is custom software, although much of the code is common to all consolidation adapters. While it is expected that such custom software will be written for a working set of major system management applications, there will always be a possibility that some management applications are being used which are not supported, i.e., for which no consolidation adapter has yet been created. In this case, the "N" branch from block 704 is taken, and an appropriate "unsupported server" entry is created in the configuration data in consolidation master database 406 (block 705). The unsupported server entry records the existence of the unsupported management application, which can be displayed to a console operator so that he knows which parts of the computer complex are unreachable using the consolidation application. This information may also be useful, e.g., if a suitable consolidation adapter is later created for the unsupported application.

If the application is supported (the "Y" branch from block 704), a determination is made whether the version of the management application is supported (block 706). As is well known, versions of application frequently change, and the consolidation adapter might be compatible only with the most recent version or versions. If the version is not supported, the "N" branch is preferably taken from step 706, and the existing system management application is upgraded to its most recent version (block 707). In either case, the appropriate consolidation adapter is then installed on the management server (block 708), and a configuration entry for the management server is created in the configuration data in consolidation master database 406 (block 709). Among other things, the configuration entry contains the network address of the management server, allowing the consolidation application to communication with the adapter in the server.

If any more management servers remain (the "Y" branch from block 710), the process returns to block 703 to select the next server. When all servers have been process, the "N" branch is taken from step 710 and installation is complete.

It will be observed that most of the steps illustrated in FIG. 7 can be performed automatically by installation software. In general, the selection of a suitable consolidation server will be manual, and there may be some manual intervention in installing the consolidation application. But given a list of management servers, an installation application can perform most of the remaining steps automatically (the exception being step 707, which may again require manual intervention). On the other hand, the steps shown in FIG. 7 could be performed entirely by a human installer, or by some combination of installation software and human input.

In general, the routines executed to implement the illustrated embodiments of the invention, whether implemented as part of an operating system or a specific application, program, object, module or sequence of instructions are referred to herein as "computer programs" or "applications". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 3 as memory 302 and data storage 304.

Although a specific embodiment of the invention has been disclosed along with certain alternatives, it will be recognized by those skilled in the art that additional variations in form and detail may be made within the scope of the claims which follow.

What is claimed is:

1. A method providing a common user system management interface in a computer system complex having a plurality of different system management applications, comprising the steps of:

installing a consolidation management application in a first system of said computer system complex, said consolidation application generating a common user interface for a plurality of different system management applications, each system management application of said plurality of different system management applications residing in a respective computer system of said computer system complex and performing system management functions independently of said consolidation management application for a respective subset of computer systems of said computer system complex, each said respective subset comprising a plurality of computer system of said computer system complex; and installing a respective consolidation adapter corresponding to each said system management application of said plurality of system management applications in the respective computer system in which each said system management application resides, each said consolidation adapter providing a communication interface between said consolidation management application and its respective system management application, each consolidation adapter receiving system management function requests in a common format generated by consolidation management application, and invoking said requests in the respective corresponding system management application in a format compatible with the system management application;

wherein said common user interface includes at least some user requests causing system management function requests in said common format to be transmitted concurrently to multiple ones of said plurality of different system management applications, and to consolidate responses received from said multiple ones of said plurality of different system management applications for presentation to a user.

2. The method of claim 1, wherein said consolidation management application and consolidation adapters are installed in a pre-existing computer system complex which, before said installation steps, is being managed by said plurality of system management applications without said consolidation management application.

3. The method of claim 1, wherein said system management function requests in a common format generated by said consolidation management application are requests formatted according to Web Services Definition Language (WSDL).

4. The method of claim 1, wherein said consolidation management application generates said common user interface as a web server in the form of an interactive web interface accessible by a web browser.

5. The method of claim 1, wherein said first system in which said consolidation application is installed is a dedicated system.

6. The method of claim 1, wherein said first system in which said consolidation application is installed contains at least one of said plurality of different system management applications.

7. The method of claim 1, wherein each said system management application comprises a respective user interface for receiving commands from a user and presenting responses to a user independently of said consolidation management application.

* * * * *